Oct. 27, 1942.    J. B. CLARK    2,300,206
TESTING WELL
Filed Oct. 30, 1941
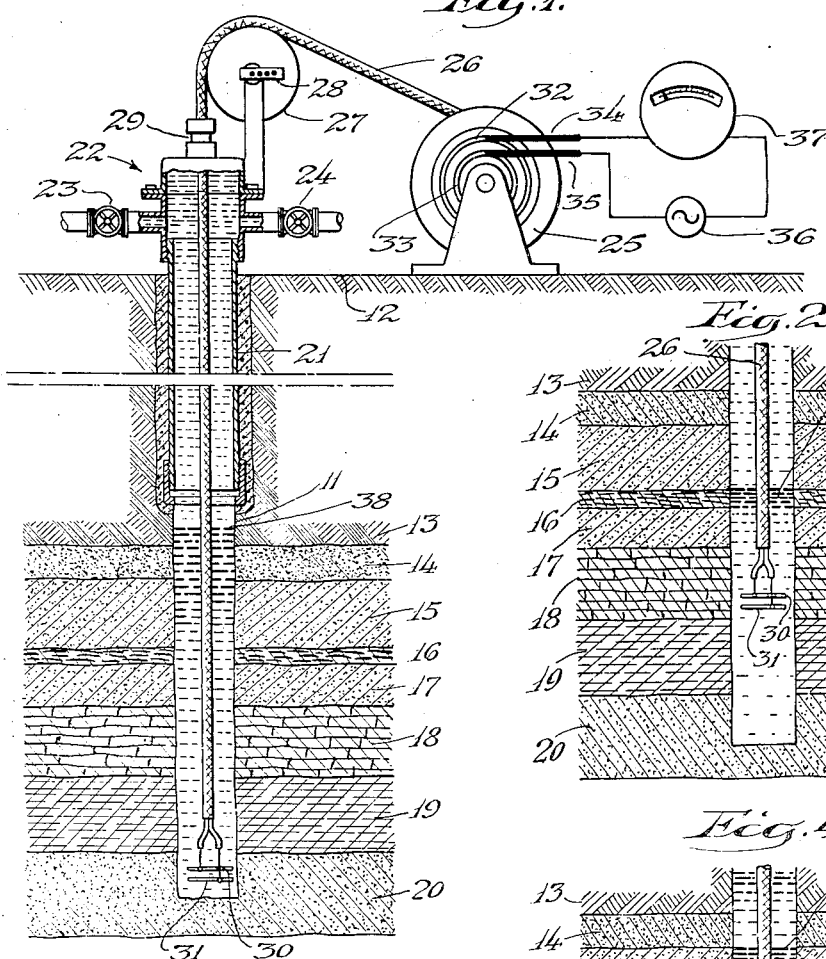
Inventor:
Joseph B. Clark
By Paul F. Hawley
Patent Agent.

Patented Oct. 27, 1942

2,300,206

UNITED STATES PATENT OFFICE 2,300,206

TESTING WELL

Joseph B. Clark, Tulsa, Okla., assignor to Stanolind Oil and Gas Company, Tulsa, Okla., a corporation of Delaware Application October 30, 1941, Serial No. 417,075

15 Claims. (Cl. 175—182)

This invention pertains to the art of the determination of the ingress of a fluid such as water into a well and in particular to the location of salt water flows into oil wells.

Although the problem of determining the location of ingress of undesired or contaminating fluids into a well has been recognized for years, no adequate means of determining the position of such points of ingress has been evolved prior to the present invention. Of the methods that have been proposed probably the most popular is electrical logging of the fluids in the well, but this has the difficulty that as the contaminating fluid pours into the well it spreads out into a continually increasing zone in which it dilutes the fluids already present in the well, thus rendering the location of the point of water entry increasingly difficult as the time during which the water is permitted to enter increases. Again, the electrical logging methods that have been proposed involve in general the movement of one or more pairs of electrodes through the fluids in the well which has the effect of mixing the contaminating material, such as water, with the well fluids and decreasing the accuracy with which the measurements can be made.

In modern oil field hydrology it is extremely important that accurate measurement of water entry be made since water may enter at one or a number of zones throughout the zone of oil production or producing section, and haphazard sealing of portions of this producing section would in general decrease the flow of oil without necessarily shutting off the water. As may be seen from this discussion, the chief difficulty in the location of the water entering the well lies in its relative mobility and diffusion. Any method which fails to take this factor into account is inherently incapable of accurate determination of the zone or zones of ingress.

I have discovered a new method of determining the location of a zone of ingress of a contaminating fluid, the specific gravity of which differs from that of the desired substance to be recovered, by which either the upper or lower boundary of the zone of fluid ingress, or both boundaries, can be accurately determined. It is therefore an object of this invention to provide a method for determining a limit of a zone of ingress of a contaminating fluid into a well which is producing a desired fluid of differing specific gravity from that of the contaminating fluid. It is a further object of this invention to provide such a method in which either or both of these limits can be accurately determined regardless of the usual diffusion of the contaminating fluid in the usual well fluid. Another object of this invention is to provide such a method in which considerable time can elapse between the instant at which the contaminating fluid is permitted to flow into the well and the time in which the observations are made, whereby the convenience of such a method is greatly increased, although the accuracy of the method is not diminished by the lapse of time. Further objects and advantages of this invention will become apparent from the following specification.

One embodiment of this invention as applied to the location of a zone of salt water ingress in an oil well has been illustrated in the accompanying drawing in order to aid in the description of the invention. This drawing forms a part of the specification and is to be read in conjunction therewith. In the figures the same reference numerals in the drawing refer to the same or corresponding part. In these figures:

Figure 1 represents in diagrammatic form a cross section through a portion of the earth's crust and an oil well penetrating the same, showing a preferred arrangement of apparatus and the first step in the determination of one boundary of the zone of water entry into the well;

Figure 2 is a diagrammatic representation of certain of the producing formations shown in Figure 1, illustrating the second step in the determination of one boundary of the zone of water ingress; and Figures 3 and 4 are diagrammatic representations of the same formations shown in Figure 2 and illustrate succeeding stages in the determination of the opposite boundary of the zone of water entry.

Referring to Figure 1, a well 11 has been drilled from the surface of the earth 12 penetrating certain formations 13—20. This well may have been equipped with one or more strings of casing 21 cemented in place above the region comprising the uncased or so-called producing section, namely, formations 13—20. At the surface a casinghead 22 has been provided with valves 23 and 24 governing the flow of fluids into or out of the well. Of the formations shown, formations 14 and 17 represent oil-producing formations, formation 15 represents a water sand and the other formations shown represent relatively impermeable beds.

Equipment is shown by means of which the conductivity of the well fluids can be determined. This includes a reel 25 on which a supply of cable 26 has been spooled, and a measuring sheave 27 of known diameter supported adjacent the well head, by means of which the depth of the cable 26 in the well 11 can be determined by reading the counter indicator 28 in a manner well known in the art. If the well is of the flowing type the cable 26 will normally pass through some variety of oil saver or stuffing box 29 to prevent the undesired escape of well fluids. The cable 26 is provided with one or more insulated conductors to which are attached electrodes. As shown in Figure 1, there are two conductors and two well electrodes 30 and 31. Mounted on the surface of the reel are insulated slip rings 32 and 33 which are connected through the cable to the well electrodes 30 and 31. Brushes 34 and 35 bear on these slip rings. A source of potential 36 is connected through a meter or other current indicator 37 across the brushes 34 and 35. Preferably the source of potential is an alternating current generator but direct current can be employed successfully if desired.

It is apparent from this arrangement of apparatus that the current flow through the meter 37 is chiefly dependent upon the resistivity of the material between the well electrodes 30 and 31. Thus if the resistivity of the well fluids is high there is relatively little current through the meter and vice versa.

I prefer to lubricate the electrodes 30 and 31 into the well and lower them approximately to the bottom thereof at the start of operations, although this is of relatively little importance if the well is not flowing. Next the well is conditioned by placing therein a material which is a liquid under well conditions of temperature and pressure, and of a greater specific gravity than that of the contaminating fluid. This conditioning fluid should be at least a fair electrical insulator and relatively immiscible with the well fluid which is to be located. For example, organic liquids such as carbon disulfide, chloroform, bromoform, carbon tetrachloride, the trichlor and tetrachlor ethanes, the corresponding bromine compounds, etc. are heavier than salt water and are sufficiently nonconducting and immiscible for these purposes. Mixtures or solutions of such liquids with each other or with lower density, nonconducting liquids can be employed. For example, a very satisfactory low cost conditioning liquid can be prepared by mixing a petroleum oil with any of these liquids in such proportions that the density exceeds by a slight margin the density of the water (actually salt solution) in the well. Preferably the density of this mixture exceeds that of the heaviest liquid produced from the well by approximately 5 per cent to approximately 30 per cent. This sort of conditioning liquid is particularly advantageous in that due to the fact that its density is only slightly above that of the water, when water is produced in the well, as described below, it flows with only a low velocity through this liquid. Also, there is less tendency for the liquid to flow into the permeable formations during the operations. Any other liquid satisfying the above conditions can, of course be used. The tendency of the conditioning fluid to flow into permeable formations in the well can also be decreased by incorporating in the conditioning liquid a sealing agent which may be a cake forming or plastering material, to which may be added if desired a gelling agent. Animal fibers, bagasse, bamboo, mineral or cornstalk fibers, cellular material, celluloid or Cellophane flakes, sawdust, blown asphaltic bitumen, sulphurized asphalt, or other similar materials are suitable as the cake forming or sealing agent. Numerous suitable gelling agents are known in the art. These materials are used to form a layer over the faces of the permeable formation which is less permeable than the formations, through which layer water from the formations can make its way when the formation pressures exceed well pressure.

Enough of the conditioning liquid is added to bring the upper level of this material in the well to a point well above the suspected top of the zone of water ingress. As the specific gravity of this conditioning liquid is somewhat greater than that of the fluids found in the well, it will settle to the bottom of the well, displacing the well fluids, and forming an interface 38 therewith. A well can be prepared for operation according to this method by simply lubricating a few drums of the heavy liquid into the well head. In many instances it is not necessary to kill the well or to stop flow therefrom. This conditioning can be accomplished for example by pumping the material in through the line associated with valve 23, while permitting well fluids to flow through the line regulated by valve 24.

After the conditioning liquid has reached the bottom of the well a short period is allowed for any other liquid which may have become entrained therewith to separate by gravity. The well is thereafter caused to flow by decreasing the pressure on the well fluids, for example by opening valve 24 if the well is a flowing well. Liquids from the permeable formations 14, 15 and 17 will flow into the well. Obviously the flow of these fluids will be upward since the specific gravity of the conditioning fluid exceeds that of any of the well fluids. It follows that there will be water contamination of the conditioning fluid in the well opposite the bottom of formation 15 and upwards, but that there can be no water contamination below this point. Thus there will be a fairly pronounced interface 39 between the uncontaminated high resistance heavy conditioning liquid in the lower portion of the well and the same liquid containing highly conducting brine as a contaminant above the interface 39. This effect can be increased if the conditioning liquid contains a small amount of an emulsifying agent, such as a mahogany soap. It should be emphasized that the position of this interface 39 will not vary with time regardless of how long fluids are allowed to flow into the well, since the flow of all the brine is upward above the interface 39. This is a considerable improvement over prior art methods, in which the vertical water migration was not controlled.

While the well is still producing, or shortly thereafter, the electrodes 30 and 31 are raised through the fluid by operation of reel 25. During this period the potential from source 36 is applied between them. The current flow will be relatively negligible until the interface 39 is passed, at which time there will be a relatively abrupt increase in current due to the presence of the brine. This significant change in current immediately indicates the position of the lowermost point of water entry into the well and the depth is measured on the counter indicator 28.

If it is desired in addition to the above, to find the upper limit to the zone of water ingress, the next step in the operation consists of reconditioning the well with a fluid which is of a lower specific gravity than the water, which is relatively nonmiscible with water, and which is of high resistivity. This fluid, for example, may be oil or any other fluid satisfying the requirements given. The means by which this conditioning fluid is added forms no part of the invention. It may be added by lowering a string of tubing to a point below the previously determined lower level of water ingress and circulating oil rapidly down through the tubing and back to the surface through the casing, or by any other means. In passing it should be noted that there is no need to displace the heavy conditioning material first added to the well below the previously determined interface 39. The water-permeated material above interface 39 should be displaced. After the conditioning, the electrodes are repositioned in the well below the point of the interface 39, as shown in Figure 3. The well is now allowed to produce slowly, causing a small amount of brine from the permeable water formation 15 to flow into the well. The electrodes are energized and another determination of the conductivity of the well fluids made by raising the electrodes. Since the conditioning liquid in this case is of lower specific gravity than that of the water, the water slowly falls down through the conditioning fluid and hence can not be found above the interface 40. Below this interface the conditioning fluid will be contaminated with the water and will accordingly be of considerably lower resistivity, hence, as the electrodes are raised the current through meter 31 will indicate a region of high conductivity and, as the electrodes pass interface 40, will suddenly show a decrease. This decrease in current indicates the upper point of water entry into the well and hence, defines the opposite boundary from that determined previously by interface 39. Again it is emphasized that the interface produced by this method remains at the upper boundary throughout the test, i. e., water is not permitted to flow upwardly in the well.

One precaution should be observed during the step of permitting the well to produce after the conditioning with the low density fluid, namely the production should be held down to such a rate that the water will not rise above the interface 40. By holding the production down to very low limits, which will depend, of course, upon the production of the well and its volume, no difficulty is experienced in this regard.

In case the well in which the water location is to be made is, as is often the case, a low pressure well which would not normally flow, the same method of operation given above will be carried out but modified to provide for a fluid lift whereby the fluids from the formations will be drawn into the well. For example, the well may be pumped, or gas lifting apparatus may be installed in a manner well known to the art. It is apparent from the description given above that the method of operation is entirely the same. There is no intent to limit the procedure involved to any particular method of causing formation fluids to enter the well.

Although I have described one method of determining the conductivity of the well fluids after the conditioning liquid has been placed, and the well permitted to produce, it is obvious that any other determination of fluid conductivity as a function of depth can be employed. In this connection the impedance between a single electrode in the well and an electrode grounded at the surface can be measured, since the total impedance measured by such apparatus depends largely upon the contact resistance at the single electrode, which is directly a function of the conductivity of the well fluids. Similarly, the conductivity of the well fluids as a function of depth can be determined simultaneously at a number of vertically spaced, stationary stations such as are shown in U. S. Patent 2,248,982, issued to John R. Gillbergh.

It can be seen from this specification that the invention can be carried out by a number of different types of apparatus and in a number of different ways, depending upon the condition of the well where it is applied. The examples given of the operations as applied in particular circumstances are merely for purposes of illustration and the invention is not limited to employment in these situations, but is best defined by the appended claims.

I claim:

1. A method of determining the location of the lowermost point of water entry into a well comprising the steps of displacing the well fluids in said well to a point above said lowermost point by a high resistivity liquid the specific gravity of which exceeds that of the water in said well, and which is substantially immiscible with said well fluids, causing water from a permeable formation to flow into said well whereby an interface is produced in the column of fluid in said well substantially at said boundary, and thereafter determining the location of said interface.

2. The method of determining the location of the lower limit of a zone of water entry into the producing section of a well comprising the steps of displacing the well fluids in said well to a point above said lower limit by a high resistivity liquid the specific gravity of which is greater than that of the water in said well, and which is substantially immiscible with water, causing fluids from permeable formations to flow into said well, and determining the conductivity of the fluids in said well at a number of vertically displaced points.

3. The method of determining the lower limit of a zone of water ingress into an oil or gas well according to claim 2 in which said high resistivity liquid comprises an organic liquid the specific gravity of which exceeds that of the water in said well.

4. The method of determining the lower limit of a zone of water ingress into an oil or gas well according to claim 2 in which said high resistivity liquid includes carbon disulfide.

5. The method of determining the lower limit of a zone of water ingress into an oil or gas well according to claim 2 in which said high resistivity liquid includes carbon tetrachloride.

6. The method of determining the lower limit of a zone of water ingress into an oil or gas well according to claim 2 in which said high resistivity liquid is a mixture of a heavy organic liquid and a petroleum oil, said mixture being of greater density than that of any liquid produced from said well.

7. The method of determining the lower limit of a zone of water ingress into an oil or gas well according to claim 2 in which said high resistivity liquid is a mixture of a heavy organic liquid and a petroleum oil, said mixture being of a density approximately within the range of 105% to 130% of the density of the heaviest liquid produced from said well.

8. The method of determining the upper and lower limits of a zone of water ingress into an oil or gas well comprising displacing the well fluids in the producing section of said oil or gas well by a first high resistivity conditioning liquid the specific gravity of which differs substantially from that of the water in the well, and which is immiscible with water, causing water from said zone to flow into said well, determining thereafter the conductivity of the fluids in said well in said producing section, and repeating the above procedure using a second high resistivity conditioning liquid the specific gravity of which differs substantially from that of the water in said well in the opposite sense from that of said first conditioning fluid.

9. The method of determining the upper and lower limits of a zone of water ingress into an oil or gas well according to claim 8 in which said first conditioning liquid comprises an organic liquid the specific gravity of which exceeds that of the water in said well.

10. The method of determining the upper and lower limits of a zone of water ingress into an oil or gas well according to claim 8 in which said first conditioning liquid includes carbon disulfide and said second conditioning liquid is a petroleum oil.

11. The method of determining the upper and lower limits of a zone of water ingress into an oil or gas well according to claim 8 in which said first conditioning liquid includes carbon tetrachloride and said second conditioning liquid is a petroleum oil.

12. The method of determining the upper and lower limits of a zone of water ingress into an oil or gas well according to claim 8 in which said first conditioning liquid is a mixture of a heavy organic liquid and a petroleum oil, said mixture being of greater density than that of any liquid produced from said well, and said second conditioning liquid is a petroleum oil.

13. The method of determining the upper and lower limits of a zone of water ingress into an oil or gas well according to claim 8 in which said first conditioning liquid is a mixture of a heavy organic liquid and a petroleum oil, the density of said mixture being within the range of approximately 105% to approximately 130% of that of the heaviest liquid produced from said well, and said second conditioning liquid is a petroleum oil.

14. The method of determining the lower limit of a zone of water ingress into an oil or gas well including the steps of displacing the well fluids in the producing section of said oil or gas well by a high resistivity conditioning liquid, the specific gravity of which is greater than that of the water in the well, and which is immiscible with water, said conditioning liquid containing a sealing agent, causing water from said zone to flow into said well and determining thereafter the conductivity of the fluids opposite the producing section in said well.

15. The method of determining the upper and lower limits of a zone of water ingress into an oil or gas well including the steps of displacing the well fluids in the producing section of said oil or gas well by a first high resistivity conditioning liquid in which has been incorporated a sealing agent, the specific gravity of said liquid differing substantially from that of the water in the well, and being substantially immiscible with water, causing water from said zone to flow into said well, determining thereafter the conductivity of the fluids in said well in said producing section, and repeating the steps of displacing the well fluids, flowing water, and determining the conductivity of the fluids in said well using a second high resistivity conditioning liquid the specific gravity of which differs substantially from that of the water in said well in the opposite sense from that of said first conditioning fluid.

JOSEPH B. CLARK.